(12) United States Patent
Uchida et al.

(10) Patent No.: US 6,530,272 B2
(45) Date of Patent: Mar. 11, 2003

(54) FLAP TEST SYSTEM

(75) Inventors: Minoru Uchida, Wako (JP); Hiroshi Yamanouchi, Wako (JP); Wataru Yada, Wako (JP); Katsutoshi Tada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/985,776

(22) Filed: Nov. 6, 2001

(65) Prior Publication Data
US 2002/0069706 A1 Jun. 13, 2002

(30) Foreign Application Priority Data

Nov. 7, 2000 (JP) ........................................ 2000-344229
Nov. 7, 2000 (JP) ........................................ 2000-344230

(51) Int. Cl.$^7$ ................................................. G01P 5/00
(52) U.S. Cl. ............................. 73/170.15; 73/170.01; 73/170.02
(58) Field of Search ..................... 73/802, 170, 170.15, 73/170.11, 856; 364/424.013; 340/945

(56) References Cited
U.S. PATENT DOCUMENTS 4,453,413 A        6/1984   Schneider
4,481,817 A    *  11/1984   Ludowyk et al. .............. 73/802
5,719,566 A    *   2/1998   Readman et al. ........... 340/945
6,196,796 B1   *   3/2001   Lozyniak et al. .............. 416/24
6,200,096 B1   *   3/2001   Kohlhepp ..................... 416/24

FOREIGN PATENT DOCUMENTS

JP            8-159938           6/1996

\* cited by examiner

*Primary Examiner*—Hezron Williams
*Assistant Examiner*—Alandra Ellington
(74) *Attorney, Agent, or Firm*—Arent Fox Kintner Plotkin & Kahn

(57) ABSTRACT

A first cylinder drives a flap to a predetermined down position. Strain gages detect strains at each part of the flap while a load that corresponds to the down position is applied to the flap by a second cylinder that has been moved by an XY table so as to track the down position. Accordingly, actual aerodynamic forces are precisely reproduced by applying a load having a size and a direction that correspond to the down position of the flap. Thus, a stationary load test, a dynamic load test, and a durability test of the flap can be carried out automatically with a small effort and in a short time.

6 Claims, 3 Drawing Sheets

FLAP TEST SYSTEM

BACKGROUND OF THE INVENTION

1. Field of the Invention

The present invention relates to a flap test system for testing the strength of a flap that is provided in a main wing of an airplane by applying a load to the flap.

2. Description of the Related Art

A system for carrying out a load bearing test that inputs a load distributed along a span direction of a main wing of an airplane is disclosed in Japanese Patent Application Laid-open No. 8-159938. The disclosed conventional system has an arrangement that includes a large number of vertically movable electromagnetic probes aligned in the span direction beneath a lower face of the main wing. A corresponding number of fixed electromagnetic probes are disposed on an upper face of the main wing. The fixed electromagnetic probes attract the movable electromagnetic probes and drive the lower face of the main wing upward to provide a load with any type of desired distribution along the span direction.

With regard to a conventional static load test for the wing flap, a weight, such as a sandbag, is placed on the flap so as to apply a load that simulates an aerodynamic load. Strain gauges are used to measure the strain of each portion of the flap.

However, the above discussed conventional static load test requires intensive effort since changing the flap state, i.e., retraction, takeoff, cruising, and landing, and the application and removal of weights for the corresponding aerodynamic loads must be carried out manually by an operator. It is also rather difficult to carry out such operations with a reliably high level of precision as the direction in which the load is applied and the size of the load cannot be adjusted accurately, which makes it very difficult if not impossible to precisely reproduce the actual aerodynamic forces acting on the flap.

Moreover, since it is difficult to finely adjust the load there is a possibility that the flap might break during the test. Furthermore, since the application and removal of weights are carried out manually, it is impossible from a practical standpoint to carry out a dynamic load test that simulates the aerodynamic loads acting on the flap during takeoff and landing of the airplane as well as a durability test in which the durability of the flap is examined when the load is applied repeatedly, which requires an unreasonable amount of time and effort.

SUMMARY OF THE INVENTION

The present invention has been carried out in view of the above-described circumstances. It is a first object of the present invention to enable precise load and durability tests to be carried out by subjecting a wing flap to a load that accurately reproduces the actual aerodynamic load. Furthermore, it is a second object of the present invention to enable a static load test, a dynamic load test, and a durability test to be carried out precisely by a single flap test system.

In order to achieve the above-described first object, in accordance with a first aspect of the flap test system of the present invention, the strength of the flap provided in a main wing of an airplane is tested by applying a load to the flap. The system includes flap operation means for driving the flap to a predetermined down position. Load input means input a predetermined load to the flap. Movement means move the load input means so as to track the flap down position. Control means control the operation of the flap operation means so as to drive the flap to the predetermined down position. The control means also control the operation of the load input and movement means so as to apply a load to the flap that corresponds to its down position. Strain detection means detect the strain of each of the parts of the flap at a corresponding down position of the flap.

In accordance with the above-described system, the flap is driven to the predetermined down position by the flap operation means, the strain of each of portion of the flap is detected by the strain detection means while the load input means applies a load to the flap that corresponds to the down position, and the movement means moves the load input means so as to track the down position. As such, a realistic aerodynamic load can be accurately simulated continuously by applying a load having a size and direction that corresponds to the flap down position. Furthermore, precise load and durability tests can automatically be performed.

In the above-described first aspect, the flap operation means corresponds to a first hydraulic cylinder, the movement means corresponds to an XY table, the load input means corresponds to a second hydraulic cylinder, the control means corresponds to a control computer, and the detection means corresponds to a strain gage.

Furthermore, in order to achieve the above-described second object, in accordance with a second aspect of the flap test system of the present invention, the strength of a flap provided in a main wing of an airplane is tested by applying a load to the flap. The system includes flap operation means for driving the flap to a predetermined down position. Load input means input a predetermined load to the flap. First control means control the operation of the flap operation means so as to operate the flap with a predetermined sequence and also control operation of the load input means so as to apply a load to the flap that corresponds to its down position. Strain detection means detect the actual strain of each of the parts of the flap at a corresponding down position of the flap. Second control means compare the actual strain of each of the parts with a reference strain that is predetermined according to the flap down position and also suspend operation of the flap operation and load input means when the actual strain exceeds the reference strain.

In accordance with the above-described system, the flap operation means drives the flap to the predetermined down position with the predetermined sequence. Also, the strain detection means detects the strain of each of the parts of the flap while the load input means applies a load that corresponds to the down position to the flap. Accordingly, the predetermined sequence, the static load test, the dynamic load test and the durability test of the flap are carried out automatically, thereby saving a great deal of effort and operation time. Moreover, the actual strain of each of the parts of the flap detected by the strain detection means is compared with the predetermined reference strain. When the actual strain exceeds the reference strain, the operation of the flap operation means and the load input means is suspended, making it possible to prevent any damage to the flap and the test system.

Furthermore, in order to achieve the above-described second object, in accordance with a third aspect of the flap test system of the present invention and in Furthermore, in order to achieve the above-described second object, in accordance with a third aspect of the flap test system of the present invention and in addition to the above-described second aspect, the flap test system further includes movement means to move the load input means so as to track the flap down position. Displacement detection means detect the actual displacement of the movement means tracking the flap down position. The second control means compares the actual displacement with a predetermined reference displacement of the movement means so as to track the flap down position and suspend the operation of the movement means when the actual displacement exceeds the reference displacement.

In accordance with the above-described system, the operation of the movement means is suspended when the actual displacement of the movement means exceeds the predetermined reference displacement of the movement means so as to track the flap down position. Accordingly, damage to the flap and the test system is prevented.

Furthermore, in order to achieve the above-described second object, in accordance with a fourth aspect of the flap test system of the present invention and in addition to the above-described second aspect or third aspect, the flap test system further includes load detection means and displacement detection means that detect the actual load and the actual displacement, respectively, of the flap operation means and the load input means. The second control means compares the actual load and actual displacement with a predetermined reference load and reference displacement, respectively, that correspond to the reference strain. The second control means also suspends operation of the flap movement means and the load input means when either the actual load exceeds the reference load or the actual displacement exceeds the reference displacement.

In accordance with the above-described system, since the operation of the flap movement means and load input means is suspended when the actual load and the actual displacement of the flap operation and load input means exceed the predetermined reference load and reference displacement that correspond to the reference strain, it is possible to prevent any damage to the flap and the test system.

Furthermore, in order to achieve the above-described second object and in accordance with a fifth aspect of the flap test system of the present invention and in addition to any one of the above-described second to fourth aspects, the flap test system further includes third control means that control the operation of the movement means which moves the load input means to track the flap down position. The first control means suspends operation of the flap operation means and the load input means when the actual load and actual displacement of the flap operation means and the load input means exceed an upper limit load and an upper limit displacement that are set higher than the reference load and the reference displacement, which correspond to the reference strain. The third control means suspends the operation of the movement means when the actual displacement of the movement means exceeds an upper limit displacement that is set higher than the reference displacement.

In accordance with the above-described system, the first control means suspends operation of the flap operation means and load input means when the actual load and the actual displacement of the flap operation means and the load input means exceed the upper limit load and the upper limit displacement that are set higher than the reference load and the reference displacement. The third control means suspends operation of the movement means when the actual displacement of the movement means exceeds the upper limit displacement that is set higher than the reference displacement. Accordingly, damage to the flap and the test system is prevented.

In the above-described second to fifth aspects, the flap operation means corresponds to a first hydraulic cylinder, the movement means corresponds to an XY table, the load input means corresponds to a second hydraulic cylinder, the first control means corresponds to first and second hydraulic control devices, the third control means corresponds to an XY table control device, the displacement detection means corresponds to a plurality of displacement gages, the load detection means corresponds to load cells, the second control means of the present invention corresponds to a measurement computer, and the strain detection means corresponds to a strain gage.

These and other objects, characteristics and advantages of the invention will be described in or be apparent from the following description of the preferred embodiment.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENT

Figure 1:
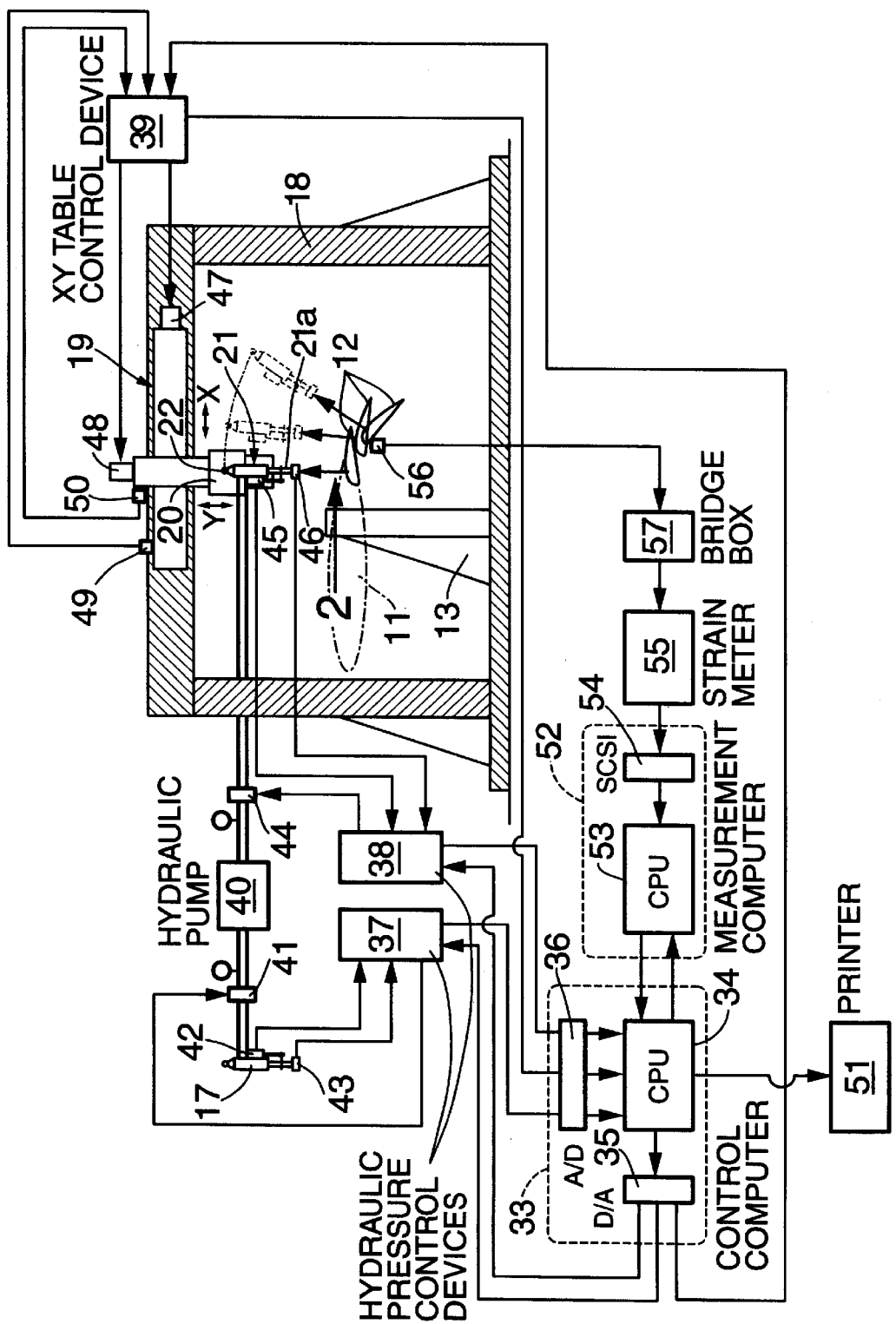
FIG. 1 is a schematic diagram showing an overall arrangement of a flap test system according to the invention.
Figure 2:
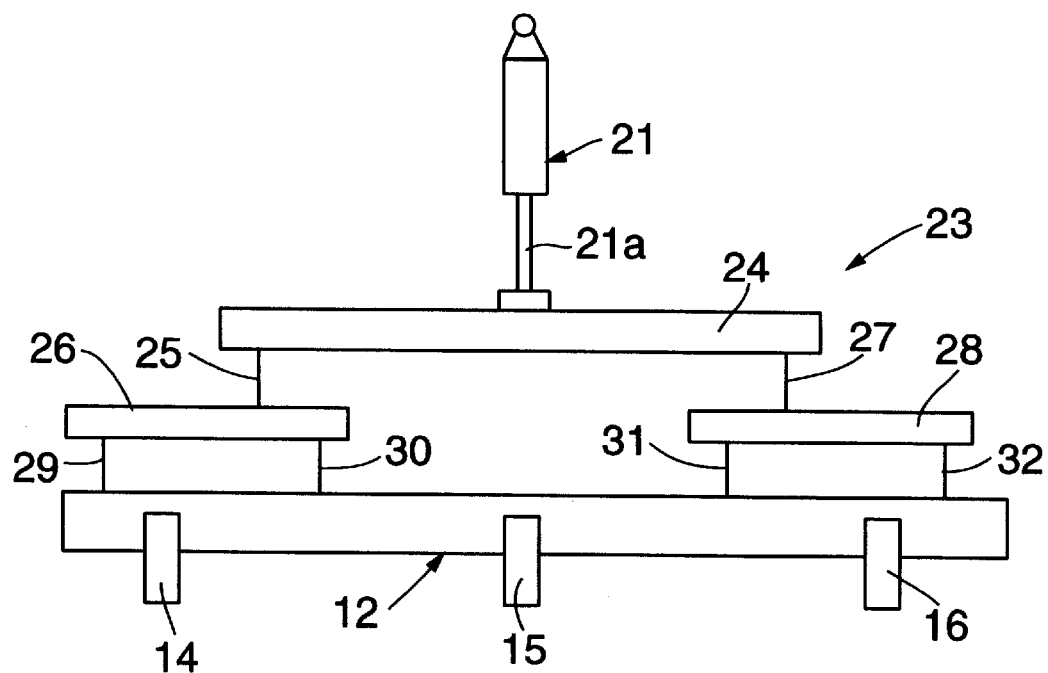
FIG. 2 is a side view of a portion of the flap test system illustrated in FIG. 1.

FIGS. 1 and 2 illustrate a flap test system for carrying out a static load test, a dynamic load test and a durability test of a slotted flap provided on the trailing edge of a main wing 11 of an airplane. The flap 12 is supported via three linkages 14, 15 and 16 on the trailing edge of the airplane main wing 11, which is supported on a stand 13. The flap 12 extends downward and to the rear by means of a first hydraulic cylinder 17. The flap 12 can stop, for example, at a retracted position with a down angle of 0° relative to a horizontal axis parallel to the ground, a takeoff position with a down angle of 20° relative to a horizontal axis parallel to the ground, and a landing position with a down angle of 35° relative to a horizontal axis parallel to the ground. Although FIG. 1 shows the first hydraulic cylinder 17 in a position that is separate from the flap 12, the first hydraulic cylinder 17 is actually provided within the main wing 11 in the vicinity of the flap 12.

An XY table 19 provided on a gate-shaped frame 18 surrounding the space above the stand 13 has a second hydraulic cylinder support 20. The support 20 is movable in the x-axis direction, i.e., the wing chord direction of the main wing 11, and in the y-axis direction, i.e., the vertical direction. A second hydraulic cylinder 21 is pivotally supported by the second hydraulic cylinder support 20 via a pin 22. A tournament bar 23 provides a link between an output rod 21a of the second hydraulic cylinder 21 and the flap 12. The tournament bar 23 is formed from a first bar 24 linked to the output rod 21a, a second bar 26 linked to one end of the first bar 24 via a rod 25, a third bar 28 linked to the other end of the first bar 24 via a rod 27, two rods 29 and 30 that link the two ends of the second bar 26 to the flap 12, and two rods 31 and 32 that link the two ends of the third bar 28 to the flap 12.

A control computer 33 includes a CPU 34, a D/A converter 35, and an A/D converter 36. The CPU 34 is connected via the D/A converter 35 to a first hydraulic control device 37 for the first hydraulic cylinder 17, a second hydraulic control device 38 for the second hydraulic cylinder 21, and an XY table control device 39 for the XY table 19.

A hydraulic pump 40 and the first hydraulic cylinder 17 are connected to each other via a solenoid valve 41. Operation of the solenoid valve 41 is controlled by the first hydraulic control device 37. The signals from a displacement gage 42 and a load cell 43 provided in the first hydraulic cylinder 17 are input into the CPU 34 of the control computer 33 via the first hydraulic control device 37 and A/D converter 36. The hydraulic pump 40 and the second hydraulic cylinder 21 are connected to each other via a solenoid valve 44. Operation of the solenoid valve 44 is controlled by the second hydraulic control device 38. The signals from a displacement gage 45 and a load cell 46 provided in the second hydraulic cylinder 21 are input into the CPU 34 of the control computer 33 via the second hydraulic control device 38 and A/D converter 36.

The XY table control device 39 controls the operation of an x-axis drive motor 47 and a y-axis drive motor 48 of the XY table 19. The signals from an x-axis displacement gage 49 and a y-axis displacement gage 50 are input into the CPU 34 of the control computer 33 via the XY table control device 39 and the A/D converter 36. Furthermore, a printer 51 is connected to the control computer 33.

A measurement computer 52 connected to the CPU 34 of the control computer 33 has a CPU 53 and a SCSI interface 54. The signal from each of the strain gages 56 mounted on the parts of the flap 12 is input into a strain meter 55 via a bridge box 57. The output from the strain meter 55 is input into the CPU 53 of the measurement computer 52 via the SCSI interface 54.

The action of the embodiment of the present invention having the above-mentioned arrangement is now explained.

Figure 3:
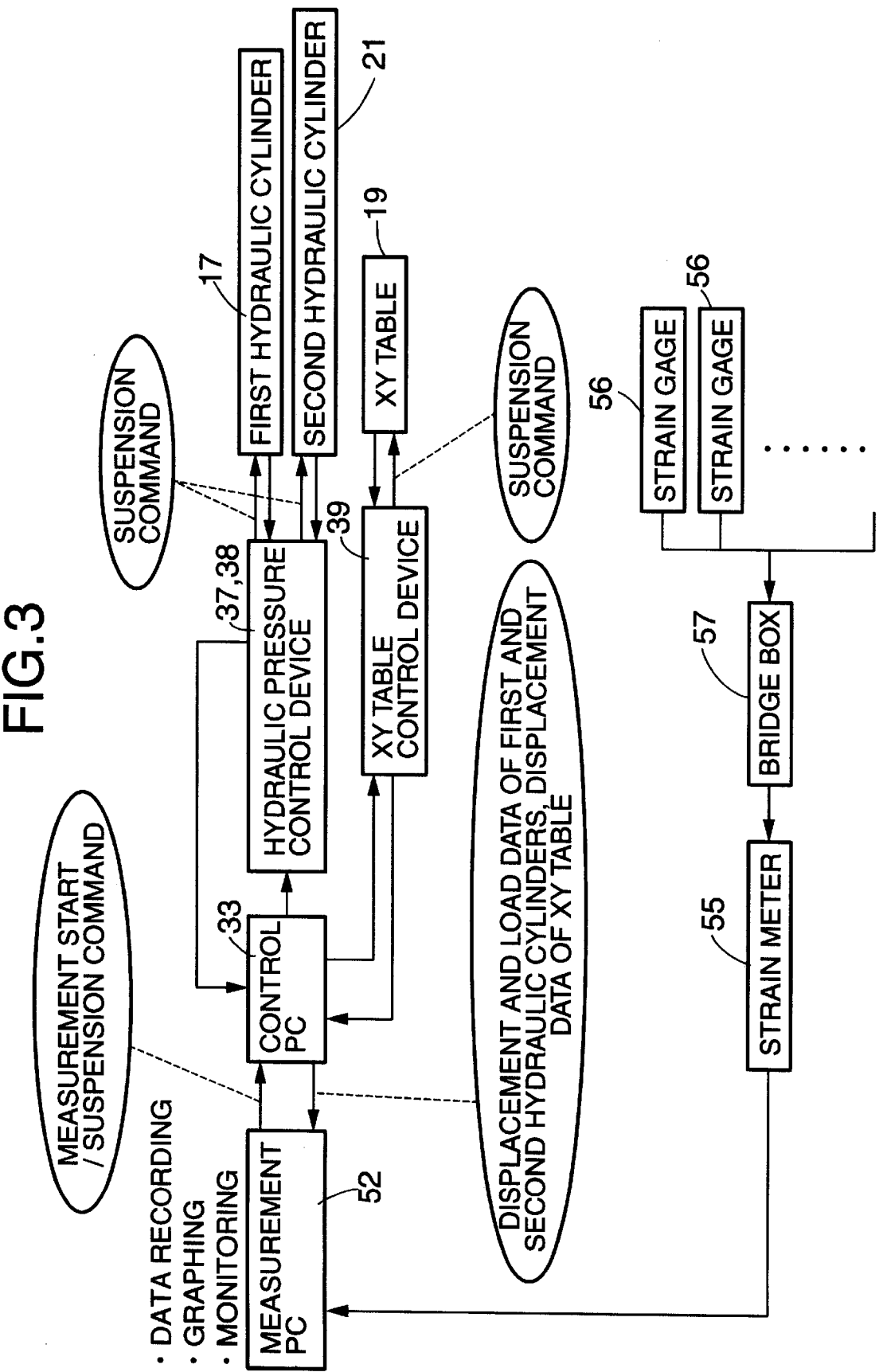
FIG. 3 is a block diagram of a control system of the flap test system.

As shown in FIGS. 1 and 3, the operating sequence of the flap 12, the size of the load applied to each operational position of the flap 12, and the position, i.e., input direction of the above-mentioned load, of the XY table 19 corresponding to each operational position of the flap 12 are prestored in the control computer 33. When the first hydraulic control device 37 controls the solenoid valve 41 in response to a command from the control computer 33, hydraulic oil from the hydraulic pump 40 is supplied to the first hydraulic cylinder 17, thus moving the flap 12 to a predetermined down position. Simultaneously, the XY table 19 operates in response to a command from the control computer 33 and moves the position of the second hydraulic cylinder 21, thereby setting the direction of a load that is to be applied to the flap 12 from the second hydraulic cylinder 21. The second hydraulic cylinder 21 operates to input a predetermined load onto the flap 12. Although the output from the second hydraulic cylinder 21 is input onto four locations, in the span direction, on the flap 12 via the tournament bar 23 (FIG. 2), setting appropriate arm ratios of the first, second and third bars 24, 26 and 28 enables a load distribution simulating the actual aerodynamic load applied to the flap 12 during flying to be reproduced.

When carrying out the static load test, the flap 12 is operated by the first hydraulic cylinder 17 so as to stop at a predetermined down angle. Then, a load having a predetermined direction and size is applied to the flap 12 by means of the XY table 19 and the second hydraulic cylinder 21. The outputs from the plurality of strain gages 56 produced in response to the deformation of each part of the flap 12 are input into the strain meter 55 via the bridge box 57. The strain of the respective parts of the loaded flap 12 calculated by the strain meter 55 are input into the measurement computer 52.

When carrying out the dynamic load test, while operating the flap 12 by means of the first hydraulic cylinder 17 to a predetermined down angle according to a predetermined sequence, a load having a predetermined size and direction is applied to the flap 12 by means of the XY table 19 and the second hydraulic cylinder 21 according to a predetermined sequence. The outputs from the strain gages 56 produced by the above-described load are input into the strain meter 55 via the bridge box 57.

When carrying out the durability test, the flap 12 is operated by the first hydraulic cylinder 17 with a sequence having a cycle of flap retraction (no load) takeoff, cruising, landing, and flap retraction (no load). For example, during takeoff, the flap 12 is lowered from the retracted position to a takeoff position having a down angle of 20°, returned to the retracted position after the completion of takeoff, thus shifting to a cruising state, lowered to a landing position having a down angle of 35°, and returned to the retracted position after the completion of landing. During the course of the above-described sequence, loads having a predetermined direction and a predetermined size are applied to the flap 12 by means of the XY table 19 and the second hydraulic cylinder 21. The outputs from the strain gages 56 produced by the above-described loads are input into the strain meter 55.

In addition to strain data of the flap 12 output from the strain meter 55, displacement data of the first and second hydraulic cylinders 17 and 21 detected by the displacement gages 42 and 45, load data of the first and second hydraulic cylinders 17 and 21 detected by the load cells 43 and 46, and displacement data of the XY table 19 detected by the displacement gages 49 and 50 are graphed in real time by the measurement computer 52 and the results are printed out by the printer 51 connected to the control computer 33.

As hereinbefore described, since the static load test, the dynamic load test and the durability test can be carried out automatically by a single flap test system, operator effort is greatly reduced. In particular, in the dynamic load test and the durability test, since the size and direction of the aerodynamic load change in response to the down position of the flap 12 and the flying state is applied to the flap 12 with any temporal sequence, the actual flying state is precisely simulated and a high precision test can be carried out.

If any one of the situations (1), (2), (3) and (4) below occurs during the execution of each of the above-described tests, suspension commands are sent from the measurement computer 52 to the first hydraulic control device 37, the second hydraulic control device 38, and the XY table control device 39 via the control computer 33. As a result, the XY table 19 stops at its current position and the supply of hydraulic pressure to the first hydraulic cylinder 17 and the second hydraulic cylinder 21 is suspended. It is thereby possible to prevent any damage to the flap 12 and the flap test system due to an excessive load.

(1) In the case of the actual strain of each of the parts of the flap 12 detected by the strain gage 56 exceeding the reference strain stored in advance in the measurement computer 52.

(2) In the case of the displacement of the first hydraulic cylinder 17 detected by the displacement gage 42 or the load of the first hydraulic cylinder 17 detected by the load cell 43 exceeding the reference displacement or the reference load stored in advance in the measurement computer 52.

(3) In the case of the displacement of the second hydraulic cylinder 21 detected by the displacement gage 45 or the load of the second hydraulic cylinder 21 detected by the load cell 46 exceeding the reference displacement or the reference load stored in advance in the measurement computer 52.

(4) In the case of the displacement of the XY table 19 detected by the displacement gages 49 and 50 exceeding the reference displacement stored in advance in the measurement computer 52.

Apart from the above-described abnormal situations (1) to (4), the operation of the first hydraulic cylinder 17, the second hydraulic cylinder 21 and the XY table 19 is also suspended in the following case. That is to say, the first hydraulic control device 37, the second hydraulic control device 38, and the XY table control device 39 are equipped with limiters. Accordingly, when any one of the limiters is operated, the operation of the first hydraulic cylinder 17, the second hydraulic cylinder 21, and the XY table 19 is forcibly suspended, thereby forming a dual safety system.

For example, in the first hydraulic control device 37 and the second hydraulic control device 38, reference loads and reference displacements of the first hydraulic cylinder 17 and the second hydraulic cylinder 21 corresponding to the above-described reference strain of the flap 12, as well as upper limit loads and upper limit displacements that are set higher than the above-described reference loads and reference displacements are stored in the first hydraulic control device 37 and the second hydraulic control device 38. When at least one of the actual loads and the actual displacements of the first hydraulic cylinder 17 and the second hydraulic cylinder 21 exceeds the above-described upper limit loads and upper limit displacements, the first hydraulic control device 37 and the second hydraulic control device 38 forcibly suspend the operation of the first hydraulic cylinder 17 and the second hydraulic cylinder 21.

Similarly, the XY table control device 39 stores an upper limit displacement that is set higher than the reference displacement of the XY table 19 that has been stored in advance for tracking the flap 12. When the actual displacement of the XY table 19 exceeds the above-described upper limit displacement, the XY table control device 39 forcibly suspends operation of the XY table 19.

It is therefore possible to forcibly suspend operation of the first hydraulic cylinder 17, the second hydraulic cylinder 21, and the XY table 19 if any one of the suspending devices provided in the first hydraulic control device 37, the second hydraulic control device 38, and the XY table control device 39 operates. This is true even in the case where the suspension commands under the above-described situations (1) to (4) are not activated for some reason or other, thereby enhancing safety.

In the flap test device of the present invention, it is also possible to send a hold command from the measurement computer 52 to the first hydraulic control device 37, the second hydraulic control device 38, and the XY table control device 39 via the control computer 33 so as to hold the hydraulic pressure of the first hydraulic cylinder 17, the second hydraulic cylinder 21, and stop the XY table 19 at its current position. In this case, after checking for the presence of abnormalities, such as deformation or damage to the flap 12 and the flap test system, if there is no abnormality, the test is resumed and continued.

As hereinbefore described, since the static load test, the dynamic load test and the durability test can be carried out automatically using a common flap test system without requiring any laborious operations, such as manually applying a load by placing a sandbag on the flap 12, not only is the operability greatly improved, but also, a high precision test is carried out. In addition, since the test can be discontinued before the flap 12 or the flap test system breaks, they can be used repeatedly, thus contributing to a reduction in cost. In particular, since the dynamic load test and the durability test, which were difficult to carry out in the industry, can now be carried out, not only can the change with time of the aerodynamic load acting on the flap 12 during takeoff and landing can be simulated precisely but also the durability over a large number of flights can be evaluated in a short time with less effort. As a result, the required strength of the flap 12 can be ensured without making the strength unnecessarily high, the flight performance can be enhanced by lightening the body weight of the plane, and a saving in the fuel consumption can be achieved.

Although a preferred embodiment of the present invention has been explained in detail above, the present invention is not limited by the embodiment and can be modified in a variety of ways.

For example, in the above-described preferred embodiment, the control computer 33 and the measurement computer 52 are provided separately, but they can be integrated into a single computer. Furthermore, a slotted flap 12 that descends as it moves to the rear while being supported by the linkages 14, 15 and 16 is illustrated, but the present invention can also be applied to another type of flap such as a plain flap, a split flap, a Fowler flap, a Zap flap or a Kruger flap.

Furthermore, the above-described reference displacement, reference load, upper limit displacement, upper limit load, and the like do not need to be the same for each of the first hydraulic cylinder 17, the second hydraulic cylinder 18, and the XY table 19, and can be set individually and freely for each thereof.

What is claimed is:

1. A flap test system for testing the strength of a flap provided in a main wing of an airplane by applying a load to the flap, the system comprising:

flap operation means for driving the flap to a predetermined down position;

a hydraulic cylinder for inputting a predetermined load to the flap;

an XY table provided with a support for said hydraulic cylinder for moving the hydraulic cylinder in an X-axis direction, which is a wing chord direction of said main wing, and in a Y-axis direction, which is a vertical direction, so as to track the predetermined down position of the flap;

control means for controlling operation of the flap operation means to drive the flap to the predetermined down position and controlling operation of the hydraulic cylinder and the XY table to apply a load to the flap that corresponds to a down position of the flap; and strain detection means for detecting a strain of each part of the flap at a corresponding down position of the flap.

2. A flap test system for testing the strength of a flap provided in a main wing of an airplane by applying a load to the flap, the system comprising:

flap operation means for driving the flap to a predetermined down position;

load input means for inputting a predetermined load to the flap;

movement means for moving the load input means so as to track the flap down position;

first control means for controlling operation of the flap operation means to operate the flap with a predetermined sequence and controlling the operation of the load input means to apply a load to the flap that corresponds to a down position of the flap;

strain detection means for detecting an actual strain of each part of the flap at a corresponding down position of the flap; and second control means for comparing the actual strain of each part of the flap with a reference strain that is predetermined according to the flap down position, and suspending operation of the flap operation means and the load input means when the actual strain exceeds the reference strain.

3. The flap test system according to claim 2, further comprising:

displacement detection means for detecting the actual displacement of the movement means that tracks the down position of the flap, wherein the second control means compares the actual displacement measured by the displacement detection means with a predetermined reference displacement of the movement means to track the down position of the flap, and wherein the second control means suspends operation of the movement means when the actual displacement exceeds the reference displacement.

4. The flap test system according to either one of claim 2 or 3, further comprising:

load detection means and displacement detection means for detecting the actual load and the actual displacement, respectively, of the flap operation means and the load input means, wherein the second control means compares the actual load and actual displacement measured by the load detection means and the displacement detection means, respectively, with a predetermined reference load and reference displacement, respectively, that correspond to the reference strain, and wherein the second control means suspends operation of the flap movement means and the load input means when either one of the actual load exceeds the reference load or the actual displacement exceeds the reference displacement.

5. The flap test system according to either one of claim 2 or 3, further comprising:

third control means for controlling operation of the movement means for moving the load input means to track the flap down position, wherein the first control means suspends operation of the flap operation means and the load input means when the actual load and the actual displacement of the flap operation means and the load input means exceed an tipper limit load and an upper limit displacement that are set higher than the reference load and the reference displacement that correspond to the reference strain, and wherein the third control means suspends operation of the movement means when the actual displacement of the movement means exceeds an upper limit displacement that is set higher than the reference displacement.

6. The flap test system according to claim 4, further comprising:

third control means for controlling the operation of the movement means for moving the load input means to track the flap down position, wherein the first control means suspends operation of the flap operation means and the load input means when the actual load and the actual displacement of the flap operation means and the load input means exceed an upper limit load and an upper limit displacement that are set higher than the reference load and the reference displacement that correspond to the reference strain, and wherein the third control means suspends operation of the movement means when the actual displacement of the movement means exceeds an upper limit displacement that is set higher than the reference displacement.

* * * * *